Oct. 25, 1938.                C. HOLZWARTH                2,134,190
                                PERCOLATOR
                            Filed Dec. 2, 1935
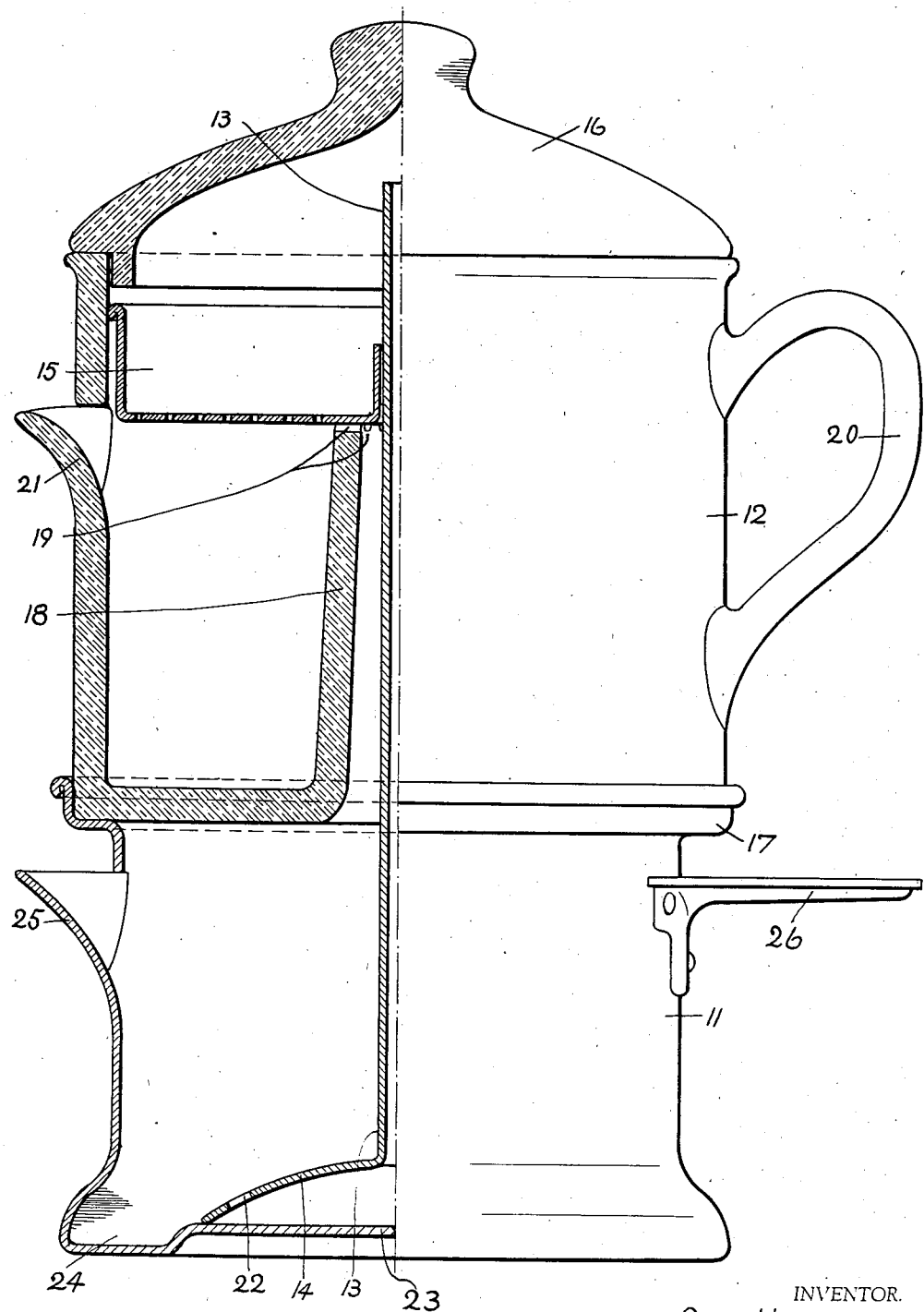
INVENTOR.
CARL HOLZWARTH.
BY Rudoy Wildermann
ATTORNEY.

Patented Oct. 25, 1938

2,134,190

UNITED STATES PATENT OFFICE 2,134,190

PERCOLATOR

Carl Holzwarth, Bronx, N. Y.

Application December 2, 1935, Serial No. 52,453

5 Claims. (Cl. 53—3)

This invention concerns a percolator. It will herein be explained in its most common application, i. e. in making coffee.

Generally speaking, it is not desirable to leach out the coffee grounds completely, and where the coffee grounds are fully submerged under a body of water, we prefer to strain the leach quickly, either under pressure from one side, or by suction from the other.

Again, instead of leaching the coffee in a solid body of water, we prefer to adduce hot water from time to time during a continued filtration. There we may proceed in two ways, either by throwing water from a boiler over the coffee grounds, allowing it to percolate therethrough back into the boiler. This may be called a circulatory percolation. Or we spray or drip the water from one vessel onto the coffee grounds, from which it filters into a receiving vessel. This system may be called gravity percolation.

The first system of circulatory percolation is by far the simplest, and requires the least complicated apparatus. But in this system we cannot help passing a percolate again through the coffee grounds for further percolation, and in this manner we often remove and lose from the first, best part of the percolate the most valuable ingredients by a second circulation.

This cannot readily happen in gravity percolation, where the liquid passes only once through the grounds; but there we must be careful to arrange the spraying or dripping, so that all parts of the grounds are equally leached. On the other hand the filtrate or percolate cools off rapidly, particularly on account of passing very slowly into a cold vessel.

It is the object of this invention to combine these two last mentioned percolating systems in such a manner, that the disadvantages of either one are overcome in the combined construction.

My novel percolator has the simplicity of an apparatus of the first system. But the liquid is circulated only once, so that the fine aromatic colloids leached out in that first and only circulation are not filtered out later, because they are not passed again through the grounds.

Making use of the turbulence at the heated bottom of a boiler,—in the manner of the first system,—for throwing up the water forcefully and distributing it all over the grounds, I overcome the complication of a carefully arranged spray means, which is ordinarily incident to the second system.

At the same time I heat the receiving vessel by a novel rearrangement of parts, so that the leach is and stays hot.

It is also recognized that while a metallic vessel serves better for a boiler, the finished coffee should not be kept in such a vessel, more particularly on account of its acidity. In my improved system different kinds of vessels may be used for boiler and receiver.

Finally, I aim at attaining a better control of the progress of the process; at the same time I provide for a more effective control of steam for the purpose of heating the final product as well as for the purpose of permeating in a limited way the coffee grounds before and during percolation.

Other objects of my invention will be more fully brought forth from the following description and from the accompanying drawing, in which I show, in a partly cross-sectioned view, a substantially circular example of a device of my invention. Except in respect to perforations, spouts and handles, the device is circular.

In the exemplary execution of the drawing, my device comprises two vessels, a boiler 11, and a receiving compartment or a receiver 12. Aside therefrom it comprises several parts similar to the ones we known in the popular models of the circulatory percolation system mentioned above, e. g. a riser 13 with a steam collecting flange 14, said riser issuing past or through a filter, e. g. the filter basket 15 at the top of the apparatus, e. g. into the lid or cover 16.

The vessels 11 and 12 are arranged on top of each other, the latter being preferably aligned on top of the former, by way of a receded rim 17 at the upper end of the boiler 11 for instance. Since the boiler 11 is to be heated, it is usually executed in a heat-resisting material, metal for instance. But the receiver 12 is not exposed to any heat exceeding that of boiling water, and may therefore be executed in any suitable material, but preferably insulating material. However, in line with my introductory note, the receiver 12 should not be made of a corrosive metal which is attacked by acid; because it serves not only to receive but also to store the finished percolate, e. g. the coffee.

Whereas the riser 13 extends up into the receiver 12, a tube 18 arises from the bottom of said receiver, substantially to the level up to which the receiver is to be filled with the percolate.

The tube 18 is shown in the drawing to be part of the receiver 12, but it also may be assembled therewith separately, in a manner well known to those acquainted with this art, as long as it prevents the contents of receiver 12 from flowing or leaking from said receiver through the opening which has to be provided therein for the riser 13.

I may provide clearance in tube 18 around riser 13 in order to allow free play of steam arising from the boiler thereinto.

In a manner known to this art, the filter 15 may be supported in a raised position in the receiver 12 by either resting in a recess upon the inside of the wall of said receiver, or by resting upon a bulge or head in the riser 13. But in the drawing I show the said filter basket to be merely guided by the inside of the wall of the receiver 12; but it rests upon the top of the tube 18.

Steam developed in the boiler 11, will not only play over the bottom of the receiver 12, but it will also arise in the tube 18, thus providing efficient means for keeping warm the percolate stored in the receiver 12. But it is also desirable to provide a limited amount of steam for heating the filter basket and the contents thereof. For that purpose the upper end of tube 18 may be finished irregularly, may for instance be provided with notches 19 extending radially therein.

A suitable snout or spout 21 and a handle 20 may be provided upon the receiver 12 in the manner of a dispensing vessel.

There are of course various ways of carrying some of the steam and hot water from the bottom wall of the boiler 11 where they are produced or heated up into the dome or top of the apparatus. Also the riser 13 and flange 14 may be executed in any one of the various ways in the art. They are here shown to be made in one piece, but may of course be assembled. Means for introducing water underneath the flange 14, in replacement of the steam there generated and rising through the riser should also be provided, for instance by one or more perforations 22, at or near the circumference of the flange 14.

The apparatus of my invention is simple in use; the boiler 11 is filled with water; the receiver 12 is arranged on top thereof after the riser has been set up in the boiler; the filter basket 15 is placed into the receiver 12 around the riser 13 and resting on top of tube 18, the lid 16 is placed on top of the receiver 12 and heat is applied to the boiler 11 in any preferred way, preferably from the bottom thereof. When the heat is applied to the bottom of the boiler 11 it causes the water contained therein to boil, steam is caught underneath the flange 14, arises in the riser 13 carrying along particles of boiling water, which are ejected from the top of the riser 13 onto the cover 16, and dripping or splashing therefrom into the filter basket. Other particles of the water ejected from the riser 13 will spill directly all over the contents of the basket 15. The percolate collects in vessel 12, which in the meantime has been heated by the steam playing on the bottom and in the tube 18 of said receiving compartment 12. Eventually substantially all the water is driven out of the boiler 11, and has then collected in the receiving vessel 12 as a percolate, which then may be dispensed, by simply lifting the receiver 12 off the boiler 11, the riser 13 with the flange 14 remaining in the boiler.

Completion of the process of percolation is indicated to the operator or used, by observation of the spilling or expelling of water and steam from the riser 13. Since then most of the water has been removed from the boiler, harm to the boiler by the heat applied is prevented by allowing some water to remain therein, said remaining water cooling the boiler until the source of heat is removed.

This is facilitated by receding a central part 23 of the boiler 11, which is substantially of the same diameter as and aligned with the flange 14. After all the water on top of said receded part 23 has been evaporated, some water still remains in the annular compartment 24 around said receded part 23, and will prevent the boiler from being overheated, even though heat may still be applied after the percolating process has been completed.

It is not my intention tightly to seal the boiler 11, because in that case the steam collecting in the boiler and compressed therein would soon drive all the water from said boiler out through the riser and spill it fast over the contents of the filter basket. Such process is not intended by me; to the contrary, the water is to be driven up in parts and to be spilled slowly. For that reason I prefer suitably to vent the boiler 11, so that no excessive pressure is built up therein. Such venting may for instance be brought about by a suitably shaped spout 25, which also makes the boiler adaptable for other uses.

The boiler may be provided with a suitable grip or handle 26.

Having thus described my invention in detail, I do not wish to be limited thereby, except as the state of the art and the appended claims may require, for it is obvious that various modifications and changes may be made in the form of embodiment of my invention, without departing from the spirit and scope thereof.

What I claim is:

1. A percolator comprising a boiler, a compartment receiving the percolate removably seated on top of said boiler, a riser resting upon the bottom of said boiler and extending into said compartment, a tube forming part of and arising in said compartment, and a filter slidably fitting into said compartment and over said riser and resting on top of said tube, said tube spacedly surrounding said riser so that steam may rise from said boiler in said tube and play onto said filter.

2. A percolator comprising a boiler, a compartment for the percolate on top of said boiler, a filter in said compartment, a riser extending from said boiler through said filter, a tube arising in said compartment and spacedly surrounding said riser, said tube having a rough edge on top thereof where said tube supports said filter, so that steam may pass from said boiler up through said tube over the rough edge and spread underneath the filter.

3. In a percolator, a boiler, a riser in said boiler, a compartment removably superimposed upon said boiler and comprising a tube spacedly surrounding said riser, a filter resting on top of said tube and slidably accommodating and centrally guiding said riser through said tube, said tube being perforate near its top so that steam arising therein will spread underneath the filter.

4. In a percolator, a boiler, a compartment with concentric outer and inner walls and a bottom connecting said walls, a filter resting on said inner wall in said compartment, and a riser extending from said boiler through said filter, said inner wall spacedly surrounding said riser and being perforate near its upper end in order to allow steam arising from said boiler around said riser to play onto and to spread underneath said filter.

5. A percolator like that of claim 4 having a cover closing the compartment, the filter resting on the inner wall and vertically slidably fitting into the outer wall of said compartment.

CARL HOLZWARTH.